United States Patent
Rhodes

(10) Patent No.: US 7,775,125 B2
(45) Date of Patent: Aug. 17, 2010

(54) LOW POWER ULTRASONIC FLOW MEASUREMENT

(75) Inventor: Simon John Rhodes, Maidenhead (GB)

(73) Assignee: Flownetix, Limited, Berkshire (GB)

(*) Notice: Subject to any disclaimer, the term of this patent is extended or adjusted under 35 U.S.C. 154(b) by 235 days.

(21) Appl. No.: 12/063,759

(22) PCT Filed: Aug. 3, 2006

(86) PCT No.: PCT/GB2006/002902

§ 371 (c)(1),
(2), (4) Date: Feb. 13, 2008

(87) PCT Pub. No.: WO2007/020378

PCT Pub. Date: Feb. 22, 2007

(65) Prior Publication Data

US 2008/0250870 A1  Oct. 16, 2008

(30) Foreign Application Priority Data

Aug. 13, 2005 (GB) ............... 0516752.3
Jul. 28, 2006 (GB) ............... 0615120.3

(51) Int. Cl.
*G01F 1/66* (2006.01)
(52) U.S. Cl. .................................. 73/861.27
(58) Field of Classification Search ............. 73/861.28, 73/861.27, 861.29
See application file for complete search history.

(56) References Cited

U.S. PATENT DOCUMENTS 5,178,018 A * 1/1993 Gill ...................... 73/861.28
7,093,502 B2 * 8/2006 Kupnik et al. ............ 73/861.29

FOREIGN PATENT DOCUMENTS

| EP | 1111349 A | 6/2001 |
| GB | 2266373 A | 10/1993 |
| GB | 2294138 A | 4/1996 |
| JP | 2002148086 A | 5/2002 |
| JP | 2002148087 A | 5/2002 |
| WO | WO 96/29575 A2 | 9/1996 |
| WO | WO 2004/046658 A1 | 6/2004 |

* cited by examiner

*Primary Examiner*—Jewel Thompson
(74) *Attorney, Agent, or Firm*—Leydig, Voit & Mayer, Ltd.

(57) ABSTRACT

There is described a method of ultrasonic flow measurement for measuring a flow speed of a fluid in a conduit, the method comprising: providing an ultrasonic flow meter comprising a microprocessor, a clock, and a pair of ultrasonic transducers operable to transmit signals through the fluid and to receive the transmitted signals; switching the ultrasonic flow meter from a passive state to an active state at time intervals measured by the clock, an amount of power used by the ultrasonic flow meter in the passive state being less than an amount of power used by the ultrasonic flow meter in the active state; performing an ultrasonic flow measurement cycle; and switching the ultrasonic flow meter from the active state to the passive state following completion of an ultrasonic flow measurement cycle. There is also described an ultrasonic flow meter for measuring a flow speed of a fluid in a conduit.

19 Claims, 4 Drawing Sheets

LOW POWER ULTRASONIC FLOW MEASUREMENT

CROSS REFERENCE TO RELATED APPLICATIONS

This application is a National Phase of International Application Serial No. PCT/GB2006/002902 which was filed on Aug. 3, 2006 which claims priority to Great Britain Patent Application Serial No. 0615120.3 filed Jul. 28, 2006 and Great Britain Patent Application Serial No. 0516752.3 filed on Aug. 13, 2005.

FIELD OF THE INVENTION

The present invention relates to a method of ultrasonic flow measurement for measuring a flow speed of a fluid in a conduit, and to an ultrasonic flow meter for measuring a flow speed of a fluid in a conduit.

BACKGROUND OF THE INVENTION

Ultrasonic flow meters are well known and generally fall into two categories, namely transit time ultrasonic flow meters and Doppler ultrasonic flow meters.

FIG. 1 illustrates the operation of a typical transit time ultrasonic flow meter for measuring the flow of a fluid through a pipe 10. A direction of flow of the fluid is shown by arrow X. The ultrasonic flow meter employs a pair of ultrasonic transducers 12 and 14 attached to an external surface 16 of the pipe 10. The transducers 12 and 14 are placed on opposite sides of the pipe 10 a distance L apart, with the first transducer 12 in an upstream position and the second transducer 14 in a downstream position.

To make a downstream flow measurement, a downstream ultrasonic signal Y is emitted from the upstream transducer 12 towards the downstream transducer 14 at an angle $\theta$ to the direction of flow X. A transit time $t_d$ for the downstream signal Y to reach the downstream transducer 14 is measured.

Similarly, to make an upstream flow measurement, an upstream ultrasonic signal Z is emitted from the downstream transducer 14 towards the upstream transducer 12 at an angle $\theta$ to the direction of flow X. A transit time $t_u$ for the upstream signal Z to reach the upstream transducer 12 is measured.

The transit times $t_u$ and $t_d$ are given by:

$$t_u = \frac{L}{c + v\cos\theta} \quad (1)$$

$$t_d = \frac{L}{c - v\cos\theta} \quad (2)$$

where c is the speed of sound in the fluid and v is the flow speed. A transit time difference $\Delta t$ is then given by:

$$\Delta t = t_u - t_d = \frac{2vL\cos\theta}{c^2 - v^2\cos^2\theta} \quad (3)$$

Usually the speed of sound is much larger than the flow speed (i.e. v<<c). For example, pure water at 20° C. has a sound speed of 1482 ms$^{-1}$ as compared to a typical flow speed of 0.01 to 4 ms$^{-1}$. Therefore, Equation (4) approximates to:

$$\Delta t \approx \frac{2vL\cos\theta}{c^2} \quad (4)$$

$$\Rightarrow v \approx \frac{c^2 \Delta t}{2L\cos\theta} \quad (5)$$

Furthermore, the speed of sound may be calculated from an average of the upstream and downstream transit times $t_u$ and $t_d$:

$$t_{av} = \frac{t_u + t_d}{2} = \frac{Lc}{c^2 - v^2\cos^2\theta} \approx \frac{L}{c} \quad (6)$$

$$\Rightarrow c \approx \frac{L}{t_{av}} \quad (7)$$

Thus, substituting Equation (7) into Equation (5), the flow speed may be calculated from the measured transit times as follows:

$$v \approx \frac{L\Delta t}{2t_{av}^2 \cos\theta} \quad (8)$$

Ultrasonic flow meters can be implemented in many ways. Most commonly they are used in industrial applications where alternative measurement technologies cannot be used or where high performance is required. However, such industrial ultrasonic flow meters are not suitable for high volume production or consumer markets due to their physical constraints, power consumption or cost of manufacture.

The object of this invention is to overcome the constraints of industrial ultrasonic flow meters and to provide a method and system of ultrasonic flow measurement that can operate at low power. In particular, it is desired to provide a system which can operate from a battery for up to 10 years and can be manufactured at low cost.

SUMMARY OF THE INVENTION

According to a first aspect of the present invention, there is provided a method of ultrasonic flow measurement for measuring a flow speed of a fluid in a conduit, the method comprising: providing an ultrasonic flow meter comprising a microprocessor, a clock, and a pair of ultrasonic transducers operable to transmit signals through the fluid and to receive the transmitted signals; switching the ultrasonic flow meter from a passive state to an active state at time intervals measured by the clock, an amount of power used by the ultrasonic flow meter in the passive state being less than an amount of power used by the ultrasonic flow meter in the active state; performing an ultrasonic flow measurement cycle; and switching the ultrasonic flow meter from the active state to the passive state following completion of an ultrasonic flow measurement cycle.

According to a second aspect of the present invention, there is provided an ultrasonic flow meter for measuring a flow speed of a fluid in a conduit, the ultrasonic flow meter having an active state in which ultrasonic flow measurement cycles are performed and a passive state, the ultrasonic flow meter comprising: a pair of ultrasonic transducers operable to transmit signals through the fluid and to receive the transmitted signals, the ultrasonic transducers being operable in the active state of the ultrasonic flow meter and inoperable in the passive state; a clock operable in both the active and passive states of the ultrasonic flow meter; and a microprocessor operable to switch the ultrasonic flow meter from the passive state to the active state at time intervals measured by the clock, the microprocessor further being operable to switch the ultrasonic flow meter from the active state to the passive state following completion of an ultrasonic flow measurement cycle; an amount of power used by the ultrasonic flow meter in the passive state being less than an amount of power used in the active state.

In one embodiment, one ultrasonic transducer is operable to transmit a signal through the fluid at an angle other than 90 degrees to a predominant direction of flow, the transmitted signal having a finite duration, the other ultrasonic transducer being operable to receive the transmitted signal, a transit time of the signal being the time taken for the signal to travel from said one ultrasonic transducer to said other.

In one embodiment, the microprocessor is operable to control the timing and duration of the transmitted signal such that said duration is less than said transit time.

In one embodiment, the ultrasonic flow meter further comprises: a fast clock connected to the microprocessor, the fast clock being operable in the active state of the ultrasonic flow meter and inoperable in the passive state; and a counter operable to measure said transit time, the counter being clocked by the fast clock, the counter being operable in the active state of the ultrasonic flow meter and inoperable in the passive state.

In one embodiment, the microprocessor is operable to calculate the flow rate based at least partially upon the measured transit time.

In one embodiment, the ultrasonic flow meter further comprises an amplifier operable to amplify at least a part of the signal received by said other transducer, a phase of the amplified signal being the same as a phase of the received signal, the amplifier being operable in the active state of the ultrasonic flow meter and inoperable in the passive state.

In one embodiment, the ultrasonic flow meter further comprises a phase comparator operable to provide an output which varies in dependence upon a phase difference between the transmitted signal and the received signal, the phase comparator being operable in the active state of the ultrasonic flow meter and inoperable in the passive state.

In one embodiment, the ultrasonic flow meter further comprises a phase shifter to adjust the phase of the transmitted signal before the transmitted signal is input into the phase comparator, the phase shifter being operable in the active state of the ultrasonic flow meter and inoperable in the passive state.

In one embodiment, the output of the phase comparator is a pulsing signal having a pulse width which varies in dependence upon the phase difference.

In one embodiment, the output of the phase comparator is operable to charge a capacitor.

In one embodiment, the ultrasonic flow meter further comprises a reading device connected to the capacitor, the reading device being operable to read a voltage on the capacitor, the reading device being operable in the active state of the ultrasonic flow meter and inoperable in the passive state.

In one embodiment, the microprocessor is operable to calculate the flow rate based at least partially upon the read voltage.

Thus, the present invention provides a method and apparatus for low power ultrasonic flow measurement which enables a user to determine a flow speed and direction of a fluid in a conduit, and to determine periods of gas flow in a liquid flow meter or wet periods in a gas flow meter. Furthermore, the present invention enables statistical analysis to improve accuracy and performance, and provides continuous correction for changes in fluid viscosity and temperature. Furthermore, the present invention enables automatic self-testing of the ultrasonic flow meter, as well as automatic calibration, self checking and correction for drift in circuit components.

Other preferred features of the present invention are set out in the appended claims.

BRIEF DESCRIPTION OF THE DRAWINGS

An embodiment of the present invention will now be described by way of example with reference to the accompanying drawings in which.

DETAILED DESCRIPTION OF A PREFERRED EMBODIMENT

Figure 1:
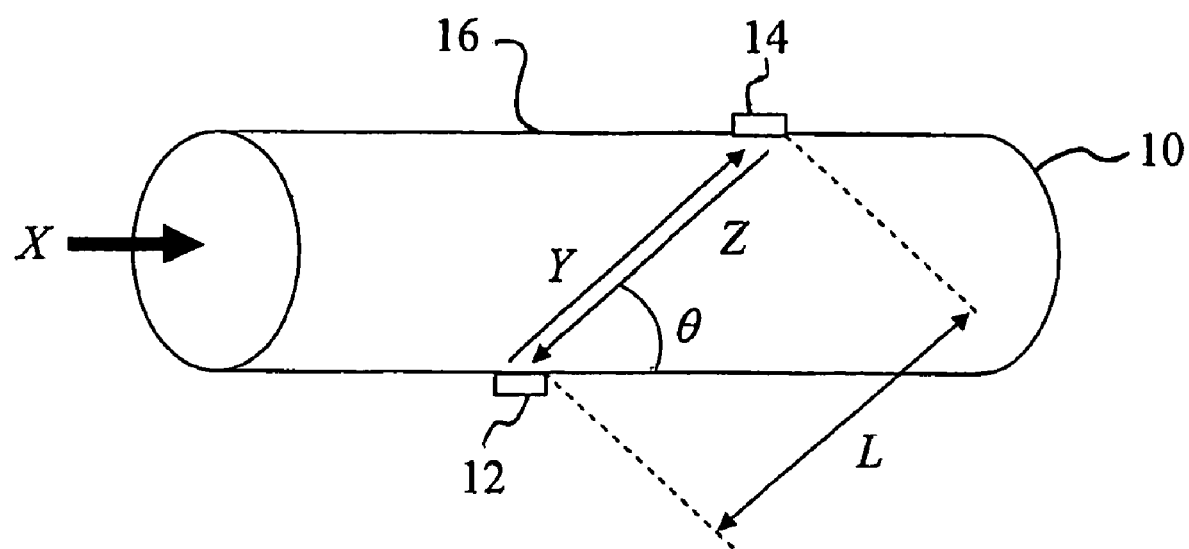
FIG. 1 illustrates the operation of a typical transit time ultrasonic flow meter for measuring the flow of a fluid through a pipe.
Figure 2:
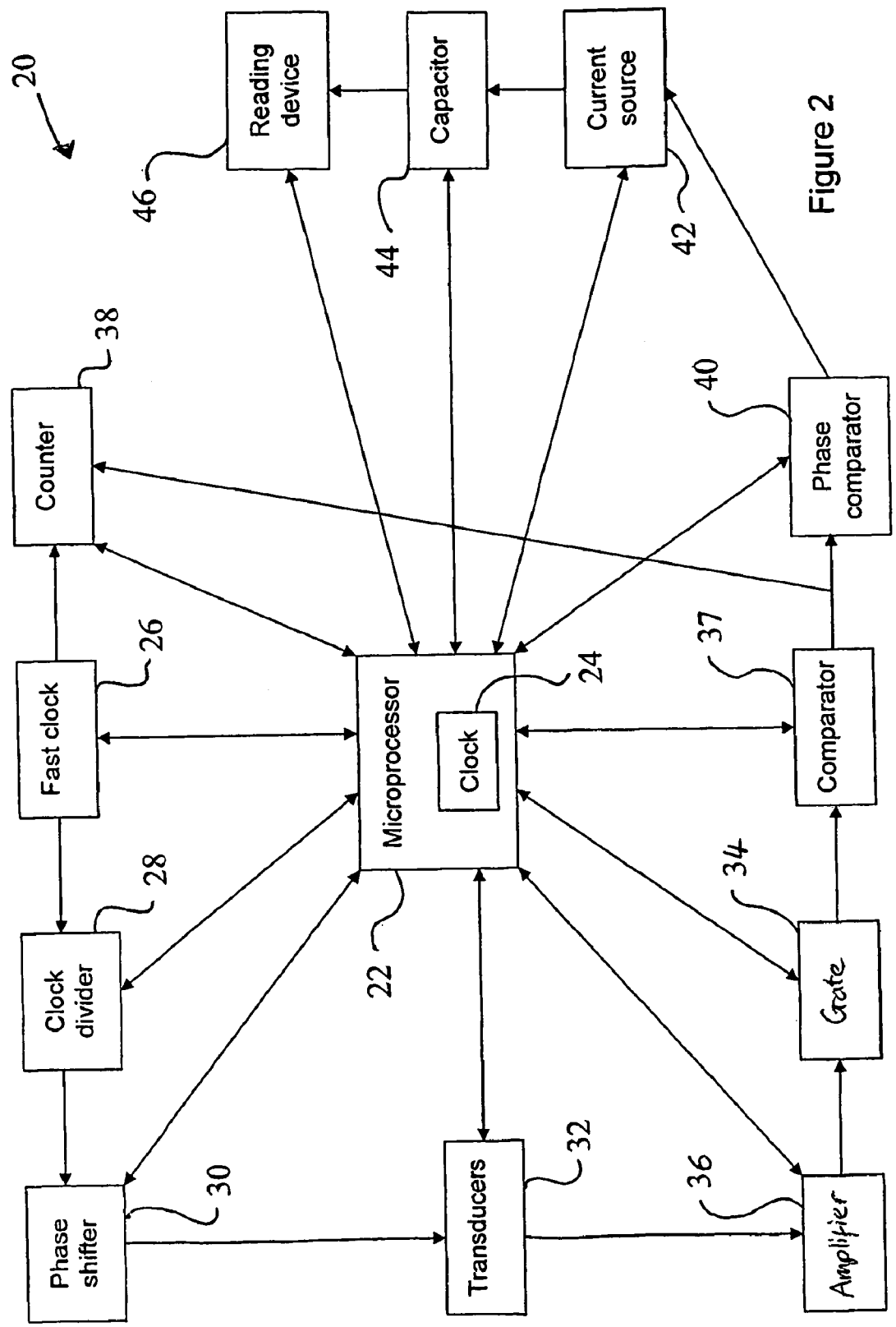
FIG. 2 is a schematic representation of an ultrasonic flow meter according to an embodiment of the present invention.

FIG. 2 is a schematic representation of an ultrasonic flow meter 20 according to an embodiment of the present invention. The ultrasonic flow meter 20 may be used for measuring a flow rate of a fluid in a conduit.

The ultrasonic flow meter 20 comprises a low power microprocessor 22 which has an internal clock 24. The internal clock circuit uses an external low frequency crystal oscillator to ensure stability over time and temperature, a 32 kHz watch crystal is typically used. In alternative embodiments, the clock 24 need not be internal to the microprocessor. The ultrasonic flow meter further comprises a fast clock 26, a clock divider 28, a phase shifter 30, an array of ultrasonic transducers 32, a gate 34, an amplifier 36, a comparator 37, a counter 38, a phase comparator 40, a current source 42, a capacitor 44, and a reading device 46. The microprocessor 22 is the heart of the system and controls the timing of all the various steps in the ultrasonic measurement process. The microprocessor 22 is therefore directly or indirectly connected to all of the ultrasonic flow meter components mentioned above.

The array of ultrasonic transducers 32 is arranged as in the prior art such that transducers in the array 32 can transmit signals through the fluid and receive the transmitted signals. The array 32 comprises at least one pair of ultrasonic transducers, each pair together forming a respective transmitter-receiver pair. Preferably, each transducer in the pair may receive and transmit ultrasonic signals. However, it is also envisaged that separate transducers may be provided for the transmitting and receiving functions. As in the prior art, a transducer pair may be affixed on opposite sides of an external surface of the conduit, with one transducer in an upstream position and one transducer in a downstream position. Thus, a pair of upstream and downstream transit time measurements will enable a flow speed of the fluid in the conduit to be calculated. The array of ultrasonic transducers 32 may be connected to the microprocessor 32 via a multiplexer that allows any transducer to be connected to a transmitter or receiver circuit at any time in any combination.

In use, the ultrasonic flow meter 20 has two operating states: an active state in which ultrasonic flow measurement cycles are performed, and a passive state. The ultrasonic flow meter uses very little power in the passive state such that an amount of power used by the ultrasonic flow meter in the passive state is less than an amount of power used in the active state. Preferably, an amount of power used by the ultrasonic flow meter in the passive state is at least one order of magnitude less than an amount of power used in the active state. More preferably, an amount of power used by the ultrasonic flow meter in the passive state is at least two orders of magnitude less than an amount of power used in the active state. More preferably, an amount of power used by the ultrasonic flow meter in the passive state is at least three orders of magnitude less than an amount of power used in the active state.

For a majority of the time, the ultrasonic flow meter 20 is in the passive state in which various components (including the fast clock 26, amplifier 36, and the reading device 46) have been disabled by a disable signal from the microprocessor 22. These various components are preferably chosen such that they draw very little current when disabled. The internal clock 24 runs at ultra low power in both the active and passive states of the ultrasonic flow meter 20.

At time intervals T1, the internal clock 24 sends an interrupt signal to the microprocessor 22. On receiving the interrupt signal at time $t_1$, the microprocessor 22 switches the ultrasonic flow meter 20 from the passive state to the active state to perform an ultrasonic flow measurement cycle.

Figure 3:
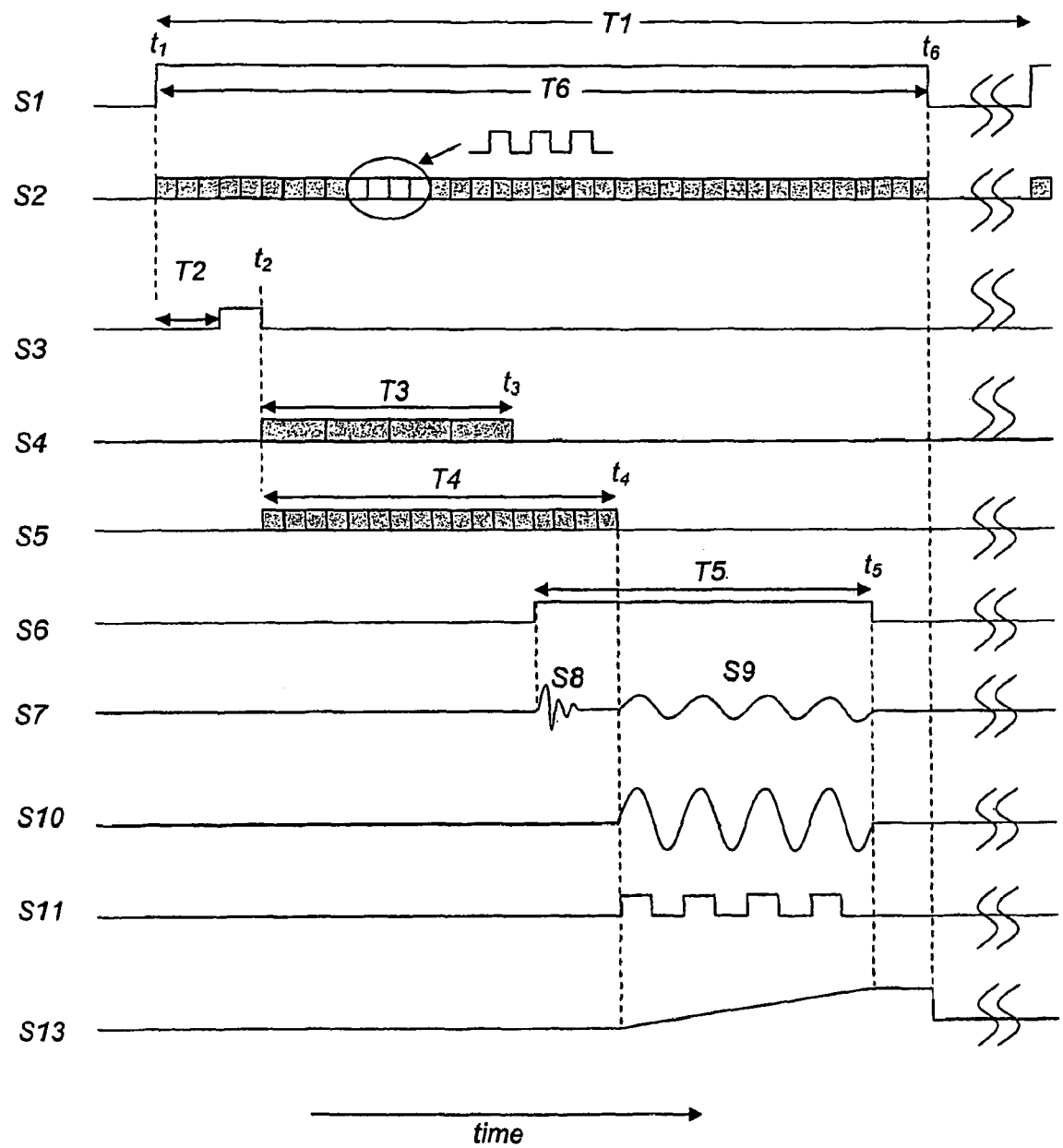
FIG. 3 shows the timings of part of an ultrasonic flow measurement cycle.

As shown in FIG. 3, at the start of the ultrasonic flow measurement cycle, the microprocessor 22 sends an enable signal S1 to the fast clock 26 at time $t_1$. On receiving the enable signal S1 at time $t_1$, the fast clock 26 starts to output a fast clock signal S2 having a frequency and period of the fast clock 26. The frequency of the fast clock 26 is higher than a resonant frequency of the transducers in the array 32.

There is then a stabilisation delay T2 to allow the microprocessor 22 and the fast clock 26 to stabilise. Preferably, the microprocessor 22 and the fast clock 26 start in less than 10 µs, which is considerably faster than a typical crystal oscillator start-up period of between 100 ms and 10 s. After the stabilisation delay T2, the microprocessor 22 sends a clear signal S3 clocked by the fast clock 26. The clear signal S3 has a number of effects at time $t_2$.

Firstly, the microprocessor clear signal S3 resets and activates the clock divider 28 at time $t_2$. Thus, the clock divider 28 starts to obtain an input signal S2 from the fast clock 26 at the fast clock frequency. The clock divider 28 acts to divide down the input signal so as to start to provide a digital output signal S4 at the (lower) resonant frequency of the transducers in the array 32.

Secondly, the microprocessor clear signal S3 resets and activates the phase shifter 30 at time $t_2$. In particular, the phase shift of the phase shifter 30 is set to zero, and the output signal S4 of the clock divider 28 is passed through the phase shifter 30 to the transducer array 32. Since the phase shift is zero, it will be appreciated that the phase shifter 30 is only optional at this stage. Instead, at time $t_2$, the output signal S4 of the clock divider 28 could be passed directly to the transducer array 32.

Thirdly, at time $t_2$, the microprocessor 22 enables a transmitting transducer in the array 32 to transmit the signal S4 received from the phase shifter 30 to its corresponding receiving transducer. The signal S4 is transmitted at the transducer frequency optionally, multiple pairs of transducers may be in use depending on the application. Thus, the transmitted signal S4 may be simultaneously transmitted by more than one transmitting transducer in some applications.

Finally, the microprocessor clear signal S3 resets and starts the counter 38 at time $t_2$. A count S5 of the counter 38 is clocked by the fast clock 26.

At time $t_3$, the microprocessor 22 sends a signal to the transducer array 32 to terminate transmission of the signal S4 by the transmitting transducer. Thus, the transmitted signal S4 has a finite duration T3 given by $T3=t_3-t_2$. The finite duration T3 is calculated by the microprocessor such that it is shorter than a minimum expected transit time of the signal from the transmitting transducer to the receiving transducer.

Shortly before the transmitted signal S4 is due to arrive at the receiving transducer based on the fastest fluid sound speed expected, the microprocessor 22 sends a signal S6 to the transducer array 32 to activate the receiving transducer. Signal S6 is simultaneously sent from the microprocessor 22 to the amplifier 36 in order to activate the amplifier 36 at this time.

The received signal S7 is made up of an initial part comprising spurious signals S8 and a later part comprising a received version S9 of the transmitted signal S4 at the transducer frequency. The received signal S7 is passed to an amplifier 36. The amplifier 36 includes a filter (not shown) which allows only signals at the transducer frequency to pass. This filtered signal is then amplified by the amplifier 36 to produce an amplified signal. The amplifier 36 is designed to operate over a wide range of signal levels while preserving the correct phase and frequency of the incoming signal S9.

The spurious signals S8 are due to powering up the receiver chain. Therefore, in order to remove the spurious signals S8, the received signal is passed through a gate 34 after being passed through the amplifier 36. The gate 34 acts as a switch by using a simple gating function to prevent signals early in the receiving cycle from triggering a measurement. Thus, under the control of the microprocessor 22, the gate 34 inhibits the initial part of the received signal S7, and the signal output by the gate 34 is simply an amplified version of signal S9 (the received version of the transmitted signal S4).

The amplified gated signal S10 is next passed through a comparator 37 to produce a digital version S11 of the amplified signal S10. The digital signal S11 is used in a number of ways, as described below.

Firstly, the digital signal S11 is used to stop the counter 38. In particular, the first edge (rising or falling) of the digital signal S1 stops the counter 38 at time $t_4$. Thus, the counter 38 provides a measurement of the transit time of the transmitted signal S4 between the transmitting and receiving transducers. Since the counter 38 is clocked by the fast clock 26, the counter 38 measures the transit time to the nearest fast clock period. The measured transit time T4 is given by $T4=t_4-t_2$.

In addition, the digital signal S11 is used as one of the inputs into the phase comparator 40. The other input into the phase comparator 40 is a non-terminated reference version of the digital transmitted signal S4. As shown in FIG. 4, the phase comparator 40 acts to compare the phases of the two input signals S4 and S11 so as to provide a pulsing output signal S12.

Figure 4A:
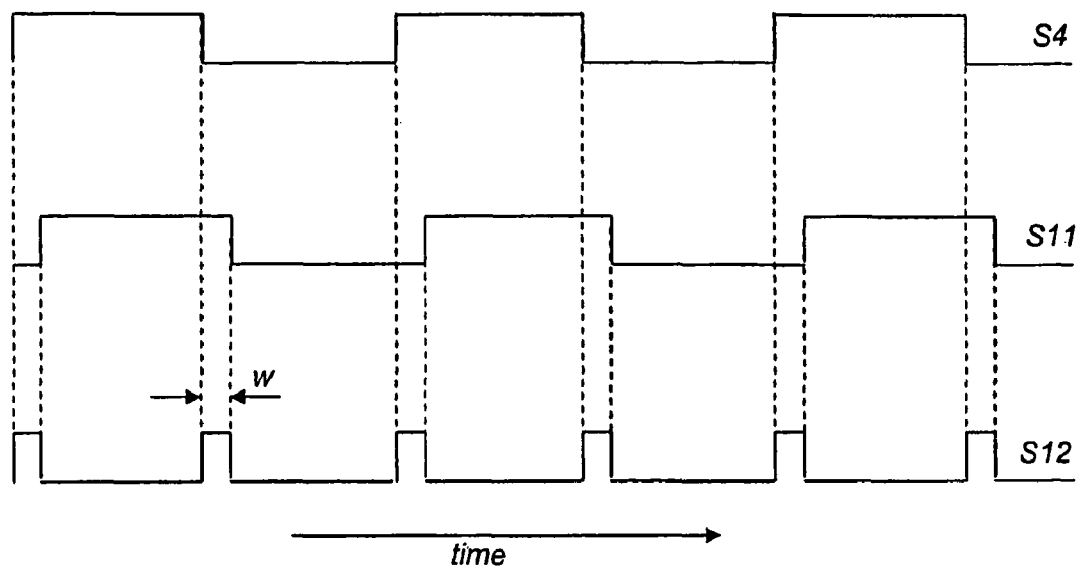
FIGS. 4a and 4b show transmitted and received signals as well as an output signal from a phase comparator.
Figure 4B:
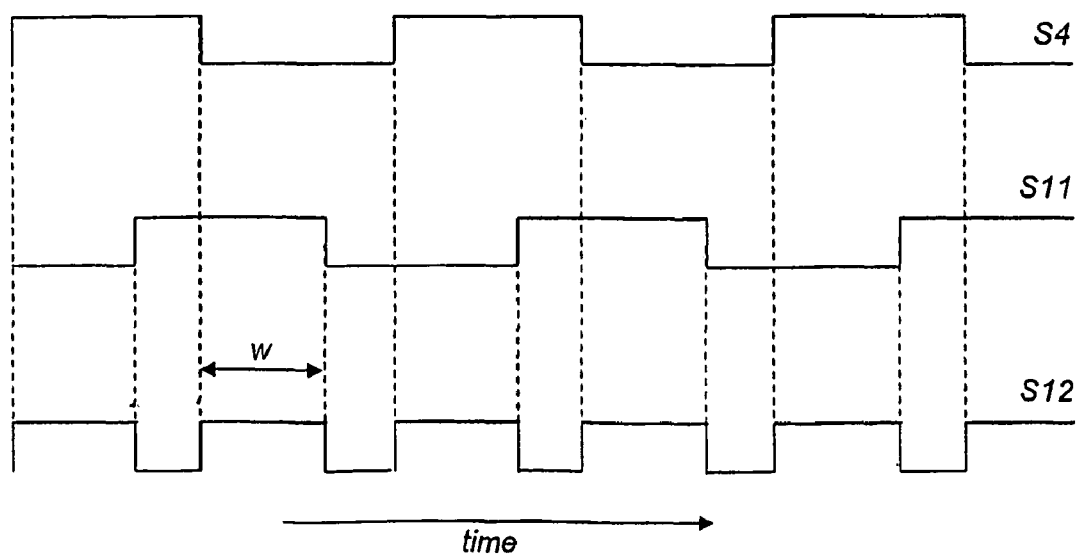

Looking at FIG. 4, a phase difference between the transmitted and received signals is relatively small in FIG. 4a, and is larger in FIG. 4b. The pulsing output signal S12 rises on a rising or falling edge of the digital transmitted signal S4, and falls on a rising or falling edge of the digital (received) signal S11. A pulse width w of the pulsing output signal S12 varies in dependence upon the phase difference between the digital transmitted signal S4 and the digital (received) signal S11. Thus, the pulse width w is smaller in FIG. 4a and larger in FIG. 4b.

In a preferred embodiment (not shown in FIG. 4), the pulsing signal S12 for a first ultrasonic flow measurement is created based on the rising edges of the signals S4 and S11, and then, for the next ultrasonic flow measurement, the pulsing signal S12 is created based on the falling edges of the signals S4 and S11. This approach of using alternate rising and falling edges allows the cancellation of effects caused by any slight changes in the shape, quality or frequency of the received signal S9, whereas there is the possibility of an offset error if only one edge is used.

The pulsing signal S12 is used to gate the current source 42 which provides a constant current with which to charge the capacitor 44. As the capacitor 44 is charged, a voltage S13 builds up on the capacitor 44. The voltage S13 is related to the phase difference between the two signals S4 and S11.

At time $t_5$, the microprocessor 22 deactivates the transducers in the array 32. Similarly, all of the other components (except the internal clock 24, the capacitor 44 and the reading device 46) are deactivated by the microprocessor 22 at this time.

After the capacitor 44 has finished charging, the microprocessor instructs the reading device 46 to read the voltage. The reading device 46 may be an analogue-to-digital converter (ADC) such as a 16-bit ADC. This gives a very high resolution measurement of the voltage, which is related to the phase difference.

To further improve the phase shift measurement technique described above, an extra phase shift can be included by adjusting the phase of the transmitted signal S4. This extra phase shift is introduced by a phase shifter (not shown) before the transmitted signal S4 is fed into the phase comparator 40. The idea of this extra phase shift is to roughly adjust the phase shift such that there is a phase shift of approximately 180° at zero flow where the phase difference is zero. This means that, at zero flow, the measured voltage is approximately in the centre of the voltage range that could be produced by charging the capacitor. As the flow increases, the voltage obtained in one flow direction will increase, and the voltage obtained in the other flow direction will decrease by roughly the same amount. Based on the expected flow rates, the system is designed such that the phase difference measurements stay away from 0° and 360° to avoid wrap-around problems.

Once the voltage has been read, the capacitor 44 is discharged at time $t_6$. The reading device 46 is also shut down at this time. All of the other components (except the microprocessor 22 and the internal clock 24) have been shut down previously. The microprocessor continues to operate for a short period to carry out mathematical functions using the measured values. In particular, the voltage measurement and the counter transit time measurement are then combined to give a more accurate measurement of the signal transit time.

This completes one measurement. However, as described in the background section, at least a pair of measurements (an upstream measurement and a downstream measurement) is required to determine the flow speed. FIG. 3 only shows the first measurement in a pair of measurements. However, it will be appreciated that the second measurement can be made in substantially the same way with the receiving and transmitting transducers swapped around.

Furthermore, a single measurement pair is unlikely to give an accurate result on its own. In general, the short sample time and the presence of particles and/or air bubbles in the fluid mean that a statistical history of previous measurements is required in order to filter, correct and damp the results to give accuracy and a usable output. Typically a measurement will be averaged with previous ones to damp out changes. In addition, a measurement that differs significantly from those around it will be rejected, as will a measurement where the received signal differs in timing or amplitude from those around it. In practise this results in a very stable average even when the input conditions are not ideal.

Once the required readings have been taken and the microprocessor has performed the required mathematical functions, an ultrasonic flow measurement cycle is complete. Therefore, the microprocessor 20 switches the ultrasonic flow meter 20 from the active state to the low power passive state.

Preferably, a period of time T6 taken to complete an ultrasonic flow measurement cycle is less than half of the time interval T1. Therefore, the ultrasonic flow meter is in the active state for less than half of the time, and therefore draws less power.

Preferably, the interval T1 is less than an expected timescale for a significant change in the flow rate. Thus, the ultrasonic flow meter 20 gives apparently continuous operation.

Preferably, the period of time T6 taken to complete an ultrasonic flow measurement cycle is between about 20 µs and 200 µs and the time T1 interval is between about 1 ms and 100 ms.

In preferred embodiments, the time interval T1 is 2.5, 7.5, 15 or 30 ms. However, alternative values may be used depending on the desired average power consumption of the ultrasonic flow meter 20.

The timings described in this embodiment are typical for a system using 2 MHz transducers across 50 mm of water. However, it will be appreciated that this embodiment is purely illustrative and the timings and digital logic functions may be easily adjusted to any frequency or pipe size and fluid type required.

Preferably, the amount of power used by the ultrasonic flow meter in the passive state is at least a hundred times smaller than the amount of power used in the active state. More preferably, the amount of power used by the ultrasonic flow meter in the passive state is less than about 100 µW and the amount of power used in the active state is between about 10 mW and 100 mW.

In a preferred embodiment of the ultrasonic flow meter 20, an average current consumption of 60 µA or less is possible, giving 10 years operation from a typical Lithium C cell. For example, for an ultrasonic flow meter 20 having a interval T1 of 30 ms and a measurement period T6 of 65 µs, with a static current of 12 µA or less during the passive state of the ultrasonic flow meter 20 and an operating current of 20 mA during the active state of the ultrasonic flow meter 20, an average operating current is 55 µA. A typical meter will operate to ±2% accuracy over a temperature range from 0° C. to 85° C.

An ultrasonic flow meter according to an embodiment of the present invention can be used as the basis for an ultrasonic flow measurement system that, by modifying the software parameters, can be used for a wide range of temperatures, for a wide range of flow rates regardless of pipe size, for a wide range of pipe sizes regardless of flow rate, and across any number of sonically conductive fluids.

A number of application issues need to be addressed in order to ensure continued accuracy of the ultrasonic flow meter across the range of applications likely to be encountered.

The first of these application issues is the ability to correct for changes in process fluid, temperature or viscosity. In practise, due to the transit time method used, the only physical effect on the measured transit time is due to changes in the sound speed of the fluid (which can be affected by any of the previously mentioned physical changes). Therefore, the sound speed of the fluid may be calculated by taking the average of at least one pair of upstream and downstream timing measurements to remove the effect due to flow as in Equation (7). Therefore, a flow speed calculated according to Equation (8) is independent of changes in process fluid, temperature and viscosity.

Another application issue relates to the use of the capacitor 44 in the determination of the phase difference. The analogue components, such as the capacitor 44, can be particularly sensitive to component tolerance, temperature drift and aging. In order to prevent this affecting the measurement result, the ultrasonic flow meter 20 is preferably able to be run in a test mode. In this test mode, the phase shifter 30 is used to create two signals: a reference transmitted signal and a phase-shifted version of that reference signal. These two signals are then used as the inputs to the phase comparator 40. In other words, a phase-shifted version of the reference transmitted signal is used as the received signal. The phase comparator 40, current source 42, capacitor 44 and reading device 46 are then used to measure the voltage on the capacitor 44, from which it is possible to calculate a measured phase difference. This measured phase difference may then be compared with the actual known phase difference imposed by the phase shifter 30. Any difference in the measured and actual values of the phase difference may then be used to correct for changes in the analogue circuit.

The ultrasonic flow meter 20 can operate a complete self check by routing the transmitted signal directly to the receiving transducer. This routing may be done, for example, using the multiplexer. Using the analogue component testing method described above, the ultrasonic flow meter 20 is able to determine its own performance without using the flowing fluid. In the event of drifts from the expected results, a correction factor may be applied. Preferably, in the event of drifts larger than a specified acceptable level, the ultrasonic flow meter 20 can inform a user and shut down to avoid incorrect measurements.

A further application issue relates to the problem of gas in a liquid tube (or liquid in a gas tube). In such a case, the ultrasonic signal may be attenuated whilst travelling from the transmitting transducer to the receiving transducer. To lessen this problem, the ultrasonic flow meter may be operable to measure an amplitude of the received signal, and, if the measured amplitude is below a predetermined threshold for a predetermined number of measurements, then the length of the time interval may be increased. This results in power saving for long periods of attenuated signal.

Yet another application issue relates to the fast clock 26. The fast clock circuit uses a fast starting, temperature and time stable oscillator to ensure continued accuracy. Periodically the performance of this oscillator may be tested in a fast clock test step in which the counter 38 is used to measure the number of fast clock periods for a specific number clock periods of the internal clock 24. As mentioned previously, the internal clock circuit uses an external low frequency crystal oscillator, such as a 32 kHz watch crystal, to ensure stability over time and temperature. Deviations from the calibrated condition may then be corrected for.

For improved accuracy, additional pairs of ultrasonic transducers operable to transmit signals through the fluid and to receive the transmitted signals may be provided. In such an embodiment, multiple transducer pair measurements can be processed and weighted to offer improved flow information, or multiple transducer pairs can be operated at different frequencies to give improved performance at lower flows or improved ultrasonic transmission. A typical example of this would be for an ultrasonic flow meter for measuring the flow in a large bore where daytime use is likely to be higher but more variable, but a lower operating range is required for night time usage where flows are more stable but very low. In this case, a set of transducers would be used to determine the flow for 10-100% of the designed range with a second set with better sensitivity when the flow is below 10% of the expected range.

Although a preferred embodiment of the invention has been described, it is to be understood that this is by way of example only and that various modifications may be contemplated.

The invention claimed is:

1. A method of ultrasonic flow measurement for measuring a flow rate of a fluid in a conduit, the method comprising the steps of:
   (a) providing an ultrasonic flow meter comprising a microprocessor, a clock, a fast clock, and a pair of ultrasonic transducers operable to transmit ultrasonic signals through the fluid at an angle other than 90 degrees to a predominant direction of flow and to receive the transmitted signals;
   (b) switching the ultrasonic flow meter from a passive state to an active state at time intervals measured by the clock, an amount of power used by the ultrasonic flow meter in the passive state being less than an amount of power used by the ultrasonic flow meter in the active state;
   (c) transmitting and receiving at least one ultrasonic signal in the active state, the ultrasonic signal having an associated transit time to travel from one ultrasonic transducer to the other;
   (d) measuring the transit time of the ultrasonic signal with a counter clocked by the fast clock;
   (e) comparing the phases of the transmitted and received signals;
   (f) providing a pulsing signal having a pulse width which varies in dependence upon a result of the phase comparison step;
   (g) charging a capacitor using the pulsing signal;
   (h) measuring a voltage on the capacitor;
   (i) calculating the flow rate based at least partially upon the measured transit time and at least partially on the measured voltage; and
   (j) switching the ultrasonic flow meter from the active state to the passive state following the calculation of the flow rate.

2. The method of claim 1 further comprising a step of amplifying at least a part of the received signal prior to the phase comparison step, a phase of the amplified signal being the same as a phase of the received signal.

3. The method of claim 1 in which the phase of the transmitted signal is adjusted prior to the phase comparison step, such that a result of the phase comparison step is approximately 180° at zero flow rate.

4. The method of claim 1 further comprising a step of discharging the capacitor.

5. The method of claim 1 in which the at least one ultrasonic signal comprises an upstream ultrasonic signal and a downstream ultrasonic signal, the method further comprising:
   calculating a speed of sound in the fluid based at least partially upon an average of the measured transit times for the upstream ultrasonic signal and the downstream ultrasonic signal; and
   calculating the flow rate based at least partially upon the calculated sound speed.

6. The method of claim 1 in which the at least one ultrasonic signal comprises a plurality of upstream ultrasonic signals and a plurality of downstream ultrasonic signals and the method further comprises:

averaging the measured transit times of the plurality of upstream ultrasonic signals to provide an average upstream transit time; and averaging the measured transit times of the plurality of downstream ultrasonic signals to provide an average downstream transit time.

7. The method of claim 1 in which the at least one ultrasonic signal comprises a plurality of upstream ultrasonic signals and a plurality of downstream ultrasonic signals and the method further comprises:

calculating a plurality of flow rates, each calculated flow rate being based at least partially upon a respective pair of upstream and downstream ultrasonic signals; and averaging the plurality of calculated flow rates to provide an average flow rate.

8. The method of claim 1 further comprising a test measurement step in which a phase-shifted version of the transmitted signal is used as the received signal.

9. The method of claim 1 further comprising a fast clock test step.

10. The method of claim 1 further comprising the steps of:
measuring an amplitude of the received signal; and
increasing a length of said time interval if the measured amplitude is below a predetermined threshold for a predetermined number of measurements.

11. The method of claim 1 further comprising providing additional pairs of ultrasonic transducers operable to transmit signals through the fluid and to receive the transmitted signals.

12. An ultrasonic flow meter for measuring a flow rate of a fluid in a conduit, the ultrasonic flow meter having an active state in which ultrasonic flow measurements are performed and a passive state, an amount of power used by the ultrasonic flow meter in the passive state being less than an amount of power used in the active state, the ultrasonic flow meter comprising:

a pair of ultrasonic transducers operable to transmit at least one ultrasonic signal through the fluid at an angle other than 90 degrees to a predominant direction of flow and to receive the transmitted signals, the ultrasonic signal having an associated transit time to travel from one ultrasonic transducer to the other;

a clock operable in both the active and passive states of the ultrasonic flow meter;

a microprocessor operable to switch the ultrasonic flow meter from the passive state to the active state at time intervals measured by the clock, the microprocessor further being operable to switch the ultrasonic flow meter from the active state to the passive state following calculation of the flow rate;

a fast clock connected to the microprocessor;

a counter clocked by the fast clock and operable to measure the transit time of the ultrasonic signal;

a phase comparator operable to provide a pulsing signal having a pulse width which varies in dependence upon a phase difference between the transmitted signal and the received signal;

a capacitor operable to be charged by the pulsing signal; and a reading device operable to read a voltage on the capacitor;

wherein the microprocessor is operable to calculate the flow rate based at least partially upon the measured transit time and at least partially on the read voltage; and wherein the ultrasonic transducers, the fast clock, the counter, the phase comparator, and the reading device are operable in the active state of the ultrasonic flow meter and inoperable in the passive state.

13. The method of claim 1 in which the period of time taken to perform steps (c) to (i) of the method is between about 20 µs and 200 µs and said time interval is between about 1 ms and 100 ms.

14. The method of claim 1 in which said interval is less than an expected timescale for a significant change in the flow rate.

15. The method of claim 1 in which the amount of power used by the ultrasonic flow meter in the passive state is at least a hundred times smaller than the amount of power used in the active state.

16. The method of claim 1 in which the amount of power used by the ultrasonic flow meter in the passive state is less than about 100 µW and the amount of power used in the active state is between about 10 mW and 100 mW.

17. The ultrasonic flow meter of claim 12 in which the microprocessor is operable to control a transmission time and a duration of the transmitted signal such that said duration is less than said transit time.

18. The ultrasonic flow meter of claim 12 further comprising an amplifier operable to amplify at least a part of the received signal, a phase of the amplified signal being the same as a phase of the received signal, the amplifier being operable in the active state of the ultrasonic flow meter and inoperable in the passive state.

19. The ultrasonic flow meter of claim 12 further comprising a phase shifter operable to adjust the phase of the transmitted signal before the transmitted signal is input into the phase comparator, the phase shifter being operable in the active state of the ultrasonic flow meter and inoperable in the passive state.

* * * * *